United States Patent
Schilling

(10) Patent No.: US 6,512,786 B2
(45) Date of Patent: Jan. 28, 2003

(54) MATCHED-FILTER OBTAINED SIDE INFORMATION FOR RELATIVE-SIGNAL-LEVEL DATA DETECTION FROM A SPREAD-SPECTRUM SIGNAL

(75) Inventor: Donald L. Schilling, Sands Point, NY (US)

(73) Assignee: Linex Technologies, Inc., West Long Branch, NJ (US)

( * ) Notice: Subject to any disclaimer, the term of this patent is extended or adjusted under 35 U.S.C. 154(b) by 0 days.

(21) Appl. No.: 10/038,822

(22) Filed: Jan. 8, 2002

(65) Prior Publication Data

US 2002/0057731 A1 May 16, 2002

Related U.S. Application Data

(63) Continuation of application No. 09/265,706, filed on Mar. 9, 1999.

(51) Int. Cl.[7] .......................... H04B 15/00; H04K 1/00; H04L 27/30
(52) U.S. Cl. ...................... 375/147; 375/142; 375/143; 714/774; 714/751
(58) Field of Search ................................ 375/140, 142, 375/143, 150, 152, 343, 141, 147; 708/422; 714/751, 774, 786

(56) References Cited

U.S. PATENT DOCUMENTS

| | | | | |
|---|---|---|---|---|
| 5,311,544 A | * | 5/1994 | Park et al. | 375/206 |
| 5,353,301 A | | 10/1994 | Mitzlaff | |
| 5,623,511 A | | 4/1997 | Bar-David et al. | |
| 6,112,325 A | | 8/2000 | Burshtein | |
| 6,205,168 B1 | | 3/2001 | Somayazulu | |
| 6,366,605 B1 | * | 4/2002 | Schilling | 375/147 |
| 6,404,758 B1 | * | 6/2002 | Wang | 370/342 |

* cited by examiner

*Primary Examiner*—Phuong Phu
(74) *Attorney, Agent, or Firm*—David Newman Chrtd.

(57) ABSTRACT

An improvement to a spread-spectrum receiver having a matched filter. A symbol sampler samples at the symbol time $T_S$, a plurality of symbol samples from the matched filter. A relative-signal-level decoder decodes the plurality of received-symbol samples, generating a plurality of decoded-symbol samples. A noise sampler samples at a plurality of chip times $kT_C$, but not at the symbol time $T_S$, a plurality of noise samples from the matched filter, before, after, or a combination of before and after, a symbol sample. An erasure detector detects for each decoded-symbol sample from the plurality of decoded-symbol samples and from the plurality of noise samples, an erasure condition for the corresponding decoded-symbol sample, and generates an erasure signal. An erasure decoder erasure decodes the input data using the erasure signals from the erasure detector.

7 Claims, 2 Drawing Sheets

MATCHED-FILTER OBTAINED SIDE INFORMATION FOR RELATIVE-SIGNAL-LEVEL DATA DETECTION FROM A SPREAD-SPECTRUM SIGNAL

RELATED PATENTS

This patent stems from a continuation application of U.S. patent application Ser. No. 09/265,706, and filing date of Mar. 9, 2001, entitled RELATIVE-SIGNAL-LEVEL DATA DETECTION FROM A SPREAD-SPECTRUM SIGNAL USING MATCHED-FILTER OBTAINED SIDE INFORMATION by inventor, DONALD L. SCHILLING. The benefit of the earlier filing date of the parent patent application is claimed for common subject matter pursuant to 35 U.S.C. §120.

BACKGROUND OF THE INVENTION

In a direct-sequence (DS) code-division-multiple-access (CDMA) system having a base station and a plurality of remote stations transmitting to the base station, the spread-spectrum signals from many of the remote stations arrive at the base station simultaneously. The spread-spectrum signal from each remote station may arrive at the base station with a different power level with different symbol and chip arrival times. Further, the desired spread-spectrum signal at a particular spread-spectrum receiver receiving a particular spread-spectrum channel from a particular remote station, may be fading, and is, on occasion, not detectable, or has a high error rate.

Diversity coding, forward-error-correction (FEC) decoding, and interference cancellation are approaches to reducing the error rates. RAKE may be used to combine the strongest signal paths in a fading or multipath environment. These approaches do not, in general, take advantage of the unique noise environment of a DS-CDMA system, in which noise, on the average, is due to the multiple spread-spectrum signals from the plurality of remote stations.

SUMMARY OF THE INVENTION

A general object of the invention is to reduce error rate in a direct-sequence code-division-multiple-access (DS-CDMA) spread-spectrum system.

Another object of the invention is to use the noise interference from the multiple users in the DS-CDMA system as side information in reducing error rate for decoding differentially-encoded data.

According to the present invention, as embodied and broadly described herein, an improvement to a spread-spectrum receiver at the base station in a direct-sequence code-division-multiple-access (DS-CDMA) system is provided. The spread-spectrum receiver, in a DS-CDMA system has, at an input, a plurality of spread-spectrum signals, arriving from a plurality of remote users, respectively. Each spread-spectrum signal in the plurality of spread-spectrum signals has a differentially encoded-data symbol. Each differentially encoded-data symbol is spread-spectrum processed by a chip-sequence signal lasting a symbol time $T_S$. Each remote user may be operating at a different symbol time $T_{si}$, where i is an index for the different symbol time. Each chip-sequence signal in the plurality of chip-sequence signals is different, due to a different chip sequence, from other chip-sequence signals used by other spread-spectrum signals in the plurality of spread-spectrum signals.

Each spread-spectrum receiver in the base station includes a matched filter having an impulse response matched to a desired chip-sequence signal in the plurality of chip-sequence signals. The matched filter detects a desired spread-spectrum signal in the plurality of spread-spectrum signals arriving at the spread-spectrum receiver at the base station. The desired spread-spectrum signal is spread-spectrum processed with a desired chip-sequence signal.

The improvement comprises a symbol sampler, a noise sampler, a relative-signal-level decoder, an estimator, an erasure detector, and an erasure decoder. The symbol sampler samples at a plurality of symbol times $nT_S$, a plurality of symbol samples from the desired matched filter. The integer n indexes the plurality of symbol times. Each symbol sample has time duration $T_S$. The relative-signal-level decoder decodes, with reference to the relative-signal-level of the current and previously received symbol samples, the plurality of symbol samples, thereby generating a plurality of decoded-symbol samples. As a result of noise and interference, these samples are non-binary. Hard limiting these samples prior to processing is not a preferred embodiment, but is an option included herein.

The noise sampler samples before, after, or a combination of before and after each symbol sample at a plurality of chip times $kT_C$, but not at the symbol time $T_S$, a plurality of noise samples. The estimator processes the plurality of noise samples to generate a noise estimate. The erasure detector detects, for each symbol sample and from the noise estimate, an erasure condition, and thereby generates an erasure signal. In response to the data and the erasure signals, the erasure FEC decoder, erasure decodes the symbols, as is well known in the art.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
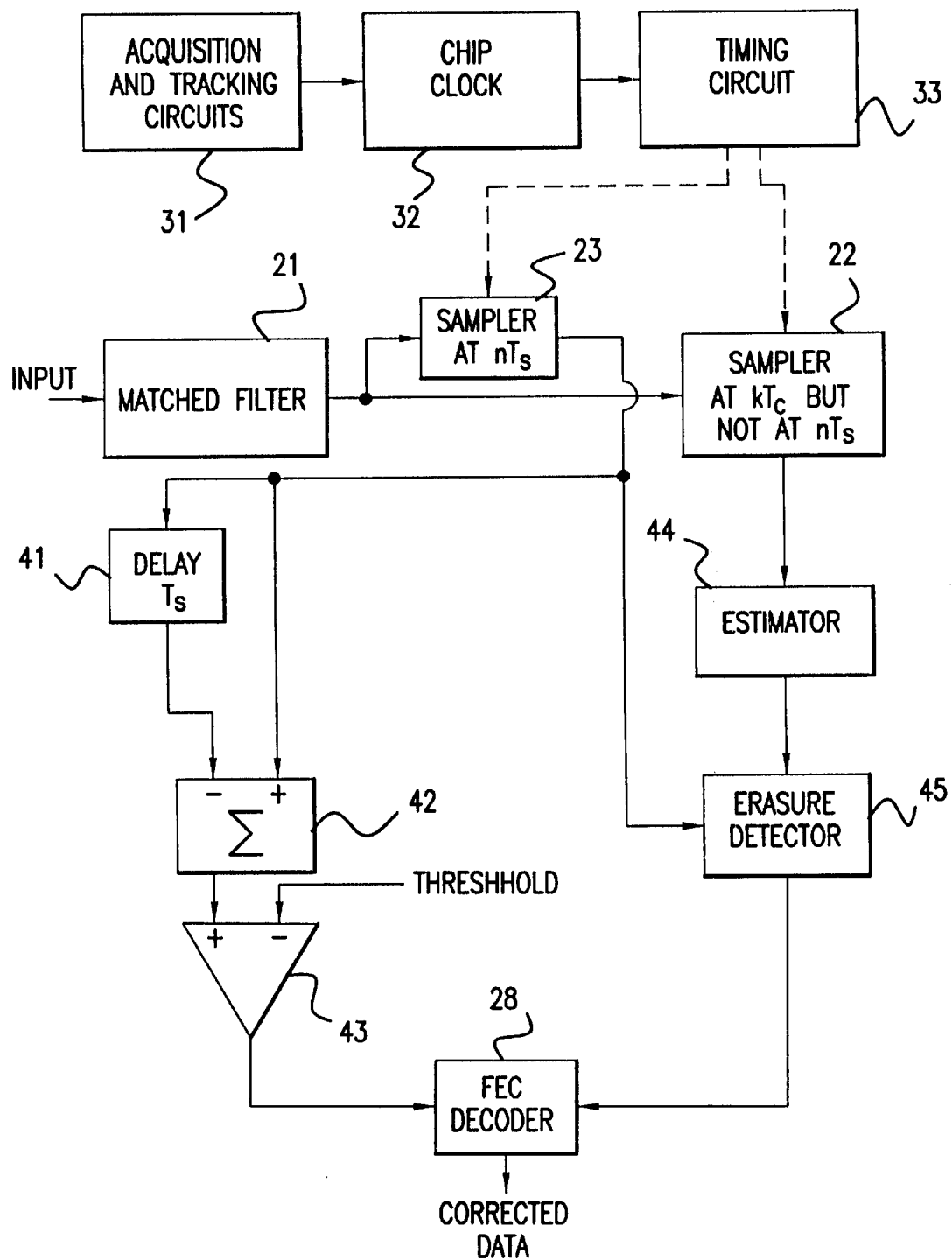
FIG. 1 is a block diagram of a relative-signal-level data symbol detector using matched-filter obtained side information.

Reference now is made in detail to the present preferred embodiments of the invention, examples of which are illustrated in the accompanying drawings.

The present invention provides an improvement to a spread-spectrum receiver in a direct-sequence code-division-multiple-access (DS-CDMA) system. The DS-CDMA system is assumed to have a base station and a plurality of remote stations. At the base station a plurality of spread-spectrum signals arrive from the plurality of remote stations, respectively. Each spread-spectrum signal modulates differentially encoded symbols. The differentially encoded symbols typically are data to be transmitted over a particular spread-spectrum channel. More particularly, the input data are differentially encoded, using techniques well-known in the art.

The present invention is anticipated to be implemented with a digital signal processor (DSP) or application specific integrated circuit (ASIC). The means plus functions, and their embodiment as a "device", "detector", "decoder" and/or "estimator", include the digital signal processor or application specific integrated circuit with software. Thus, a device, detector, decoder, and/or estimator, may be a part or a portion of a digital signal processor or ASIC, and software.

Each spread-spectrum signal in the plurality of spread-spectrum signals has a chip-sequence signal lasting a symbol time $T_S$. Each remote user may be operating at a different symbol time $T_{si}$, where i is an index for the different symbol time. Each chip-sequence signal in the plurality of chip-sequence signals is different from other chip-sequence signals used by other spread-spectrum signals in the plurality of spread-spectrum signals. Each chip-sequence signal is different since a different chip sequence is used for each chip-sequence signal in the plurality of chip-sequence signals.

The invention anticipates the use of interfering spread-spectrum signals from the DS-CDMA system as side information to reduce error rate. Consider a received plurality of spread-spectrum signals r(t), which includes a desired spread-spectrum signal $S_o(t)$ and a multiplicity of interfering spread-spectrum signals $S_i(t)$, where i is an index referring to each of the multiplicity of interfering signals. Then the received plurality of spread-spectrum signals r(t) may be expressed as a sum of the desired spread-spectrum signal $S_o(t)$ plus the sum of the interfering spread-spectrum signals $s_i(t)$:

$$r(t)=s_o(t)+\Sigma s_i(t)$$

On the average, only half of the interfering spread-spectrum signals are changing a data bit, or data symbol, from a +1 to a −1 symbol or bit, or from a −1 to a +1 symbol or bit, at any point in time. Thus, during a symbol time, $0<t \leq T_S$, the interfering spread-spectrum signals $s_1(t)$, $s_2(t)$, $s_3(t)$, ... $s_N(t)$, on average are a "one" ("1") bit half of the time. Thus, half of the interfering spread-spectrum signals change from −1 to +1 and +1 to −1, and the other half of the interfering spread-spectrum signals do not change state, and go from +1 to +1 and −1 to −1.

When the DS-CDMA system is operating at or near capacity, then the signal-to-interference ratio (SIR) at the output of the matched filter of the spread-spectrum receiver may be 3 dB. With the observation, for the DS-CDMA system, that if half of the interfering signals changed state from +1 to −1 or vice versa, then the interference level does not change for the other half of the interfering spread-spectrum signals. This is because half of the interfering spread-spectrum signals transition from a −1 to a −1 or from a +1 to a +1, which result in no change in signal level. Thus, on the average, half of the interfering spread-spectrum signals did not change state, then on the average, half of the interfering spread-spectrum signals are constant. Thus, half of the noise, caused by the multiuser interference, is correlated, and half of the noise is not correlated. This observation from the DS-CDMA system is used to reduce error rate with the present invention.

In the exemplary arrangement shown in FIG. 1, the spread-spectrum receiver includes despreading means, which may be embodied as a matched filter 21. The matched filter 21 has an impulse response matched to a desired chip-sequence signal in the plurality of chip-sequence signals. The matched filter 21 detects a desired spread-spectrum signal in the plurality of spread-spectrum signals arriving at the spread-spectrum receiver. In general, the matched filter 21 is for a complex signal, that is, signals having an in-phase component and a quadrature-phase component. Designing a particular embodiment for a complex signal is anticipated by the present invention. References to the various signals, symbols and estimate, in this disclosure includes embodiments as a complex signal, to embodiments as a real signal, i.e., a real component of a complex signal, and to embodiments as a magnitude of a complex signal.

While the matched filter is the preferred embodiment, the despreading means may be embodied as a correlator or a bank of correlators. The correlator(s) would include a chip-sequence generator, for generating a chip-sequence signal matched to the desired chip-sequence signal in the plurality of chip-sequence signals, as is well-known in the art.

Each spread-spectrum signal in the plurality of spread-spectrum signals has a chip-sequence signal lasting a symbol time $T_S$. Each remote user may be operating at a different symbol time $T_{si}$, where i is an index for the different symbol time. Each chip-sequence signal in the plurality of chip-sequence signals is different from other chip-sequence signals used by other spread-spectrum signals in the plurality of spread-spectrum signals. Each chip-sequence signal is different since a different chip sequence is used for each chip-sequence signal in the plurality of chip-sequence signals.

In the exemplary arrangement shown in FIG. 1, the spread-spectrum receiver includes a matched filter 21, which has an impulse response matched to a desired chip-sequence signal in the plurality of chip-sequence signals. The desired chip-sequence signal is for the desired spread-spectrum signal to be received by the receiver. The matched filter 21 detects the desired spread-spectrum signal from the plurality of spread-spectrum signals arriving at the spread-spectrum receiver.

The improvement comprises sampler means, relative-signal-level means, estimate means, erasure-detection means, and an erasure decoder 28. The sampler means is coupled to the matched filter 21. The relative-signal-level means is coupled to the sampler means. The estimate means is coupled to the sampler means. The erasure-detection means is coupled to the estimate means and to the sampler means. The erasure decoder 28 has an erasure input coupled to the erasure-detection means and a data input coupled to the relative-signal-level means.

Figure 2:
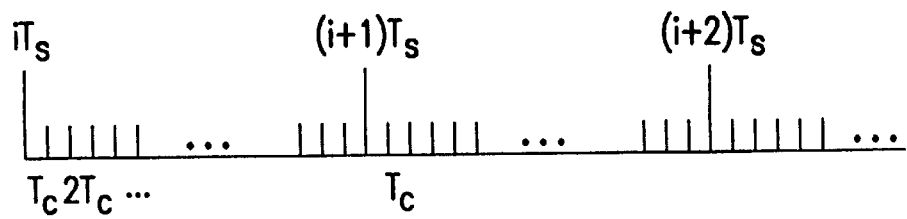
FIG. 2 shows sampling at chip time $T_C$ and symbol time $T_S$.

The sampler means samples, as shown in FIG. 2, at a plurality of symbol times $nT_S$, the plurality of symbol samples from the matched filter 21. The plurality of symbol times $nT_S$ is the time occurrence of a plurality of symbol samples, and repeats every symbol time $T_S$. The integer n is an index to each symbol time.

Figure 3:
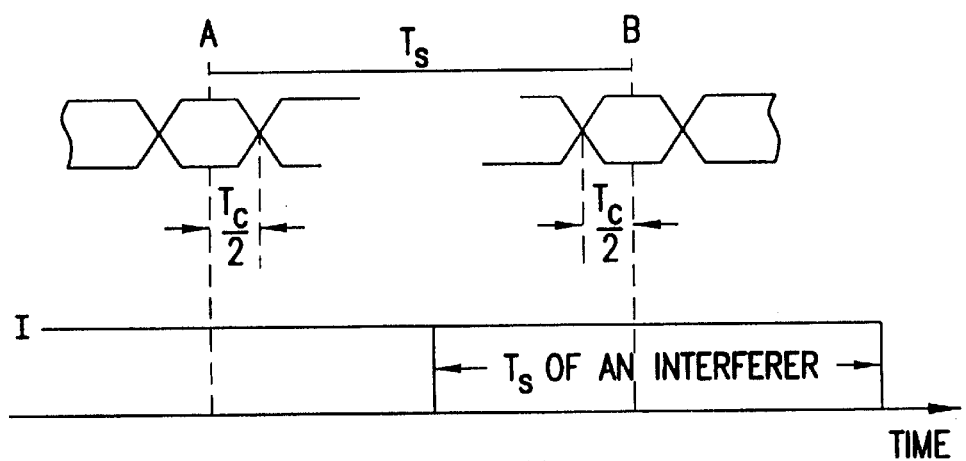
FIG. 3 shows average noise power during a symbol time

The sampler means samples at a plurality of chip times $kT_C$, but not at a plurality of symbol times $nT_S$, a plurality of noise samples, from the matched filter 21. The chip time $T_C$ is the time duration of a chip, and repeats every chip time $T_C$. The sequence of chip times is indexed by factor k. The sampling of the plurality of noise samples may occur before, after, or a combination of before and after, the sampling at each symbol time for each symbol sample. FIG. 3 shows that the symbol sample for a particular sequence of symbols may be non-synchronous for symbol samples for other sequences of symbol samples, from other spread-spectrum channels.

The relative-signal-level means decodes adjacent symbol samples of the plurality of symbol samples, thereby generating a plurality of decoded-symbol samples. The decoding preferably is from subtracting the signal level of adjacent symbol samples. The result is preferably a non-binary word, although hard limiting, which produces a binary word, could be used in a poorer quality system in which cost is of primary concern.

The estimate means estimates, or filters, a plurality of noise samples from the sampler means, to generate a noise estimate. The noise estimate may be a low-pass filtered version of the plurality of noise samples. Alternatively, using a digital signal processor embodiment or application specific integrated circuit (ASIC) embodiment, the estimate means may use a mathematical algorithm for estimating the level of noise. The mathematical algorithm may include, but is not limited to, straight averaging; root means square (RMS) averaging; and determining a median value in the plurality of noise samples.

The erasure-detection means detects from the noise estimate corresponding to a particular decoded-symbol sample from the plurality of decoded-symbol samples, an erasure condition, and thereby generates an erasure signal. The erasure condition might occur when the ratio of the particular decoded-symbol sample to the noise estimate, an SIR, is below a threshold, or when the magnitude of the difference between the decoded-symbol sample corresponding to the noise estimate is below the threshold.

The erasure decoder 28 may be embodied as an FEC decoder, and has an erasure input and a data input. The erasure input is coupled to the erasure-detection means, and the data input is coupled to the relative-signal-level means. The erasure decoder 28 erasure decodes each decoded-symbol sample, using a corresponding erasure signal. Typically, if the erasure signal from the erasure-detection means indicated a high probability of error, that is, the signal level falls between levels $\Delta_1$ and $\Delta_2$ in FIG. 5, then the erasure decoder 28 employs this added information when processing the syndrome formed in the FEC decoder. FEC erasure decoders are well known in the art and can be purchased commercially.

As illustratively shown in FIG. 1, the sampler means may include a noise sampler 22 and symbol sampler 23. The symbol sampler 23 is coupled to the matched filter 21. The symbol sampler 23 samples at a plurality of symbol times $nT_S$, a plurality of symbol samples. In a typical embodiment employing a digital signal processor or an application specific integrated circuit (ASIC), the symbol sampler 23 might be a gate, for gating the symbol sample from the matched filter 21. The timing for sampling with the gate comes from timing circuit 33.

The noise sampler 22 is coupled to the matched filter 21. The noise sampler 22 typically is a gate for gating the output data signal from the matched filter 21, at particular times. The gating is the sampling of the digital output of the matched filter 21. The noise sampler 22 samples, as illustrated in FIGS. 2 and 3, for each symbol sample at the plurality of chip times $kT_C$, but not at the plurality of symbol times $nT_S$, the plurality of noise samples. The sampling of the plurality of noise samples may occur before, after, or a combination of before and after, sampling of the corresponding symbol sample.

Timing for the noise sampler 22 and for the symbol sampler 23 may be derived from acquisition and tracking circuits 31 of the spread-spectrum receiver. The acquisition and tracking circuits may derive timing from a header portion of a packet signal, or from a separate synchronization channel. The acquisition and tracking circuits 31 generate timing which controls a chip clock 32 for the desired spread-spectrum signal to be received. The timing circuit 33, based on timing from the chip clock 32, generates appropriate timing signals for triggering sampling of noise sampler 22 and symbol sampler 23.

The relative-signal-level means is embodied as relative-signal-level detector, which includes a delay device 41, a combiner 42, and a comparator 43. The delay device 41 is coupled to the symbol sampler 23. The delay device 41 delays an n-bit symbol sample, one symbol time $T_S$, thereby generating a delayed-symbol sample.

The combiner 42 is coupled to the delay device 41 and to the symbol sampler 23. The combiner 42 subtracts the delayed-symbol sample from the symbol sample, thereby generating a relative-signal-level sample.

The comparator 43 is coupled to the combiner 42. The comparator 43 has a threshold input with a threshold, typically a voltage level. The comparator 43 compares the relative-signal-level sample to the threshold, thereby generating each decoded-symbol sample of the plurality of decoded-symbol samples.

While the invention broadly applies to n-bit symbol samples, where n is the number of bits per symbol, when the symbol samples are binary digits or bits, then the relative-signal-level means might be embodied as a differential decoder. Differential decoders are well known in the art.

The estimate means may be embodied as an estimator 44, such as a register or memory circuit, for storing and averaging the plurality of noise samples. The estimate means may include a low pass filter, or an algorithm for computing or determining an average. The algorithm may be, by way of example, root means square averaging, means square averaging, straight averaging, weighted averaging, or determining a median value.

The erasure-detection means may be embodied as an erasure detector 45. The erasure detector 45 is coupled to the symbol sampler 23, the estimator 44 and the erasure decoder 28. The erasure detector 45, using a particular symbol sample, from the symbol sampler 23, and a corresponding noise estimate from the estimator 44, generates an erasure signal. Typically, the erasure detector 45 compares the symbol sample to the noise estimate, and if the comparison failed to meet a certain criterion or crosses a threshold, then the erasure detector 45 generates the erasure signal to erasure decode the corresponding symbols.

Figure 4:
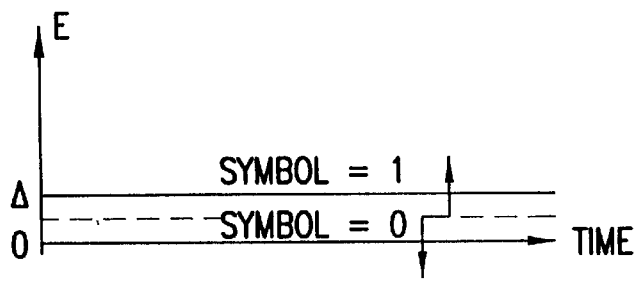
FIG. 4 shows a threshold between a 1 and 0 bit.
Figure 5:
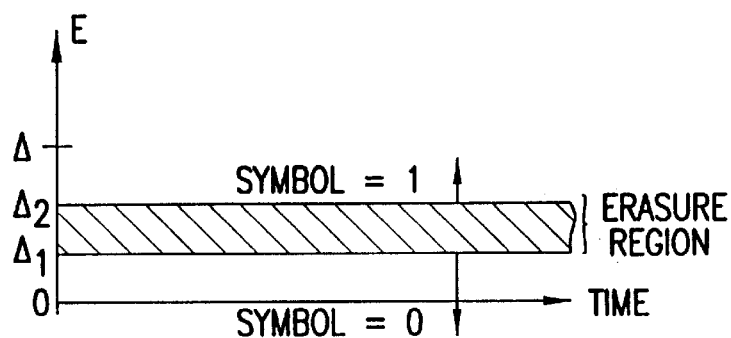
FIG. 5 shows an erasure region.

FIG. 4 illustrates detection between a symbol=1 and a symbol=0, without erasure decoding, by comparing the output of the matched filter 21 to a threshold. FIG. 5 illustrates detection between a symbol=1 and a symbol=0, with erasure decoding. With erasure decoding, there is an in-between region, where an error has a likelihood of occurring. The comparison of the symbol sample and the noise estimate might be from a signal-to-interference ratio (SIR) or energy ratio, and if the SIR for the particular symbol sample and noise estimate failed to cross a threshold, then the erasure signal indicates to erasure decode the particular symbol sample. The criterion also may be based on the energy of the symbol sample, and noise estimate, or from subtracting the noise estimate from the symbol sample. Other algorithms or criteria may be used, based on the symbol sample and the noise estimate, to determine if the symbol sample were to be erasure decoded.

In use, a plurality of spread-spectrum signals arrive at the input to the receiver. The matched filter 21 detects the desired spread-spectrum signal from the plurality of spread-spectrum signals, by having an impulse response matched to the desired chip-sequence signal. At the output of the matched filter, the symbol sampler 23 samples at each symbol time, $nT_S$, to generate a plurality of symbol samples. The noise sampler 22, for each symbol sample, samples at a plurality of chip times $kT_C$, to generate a plurality of noise samples. The estimator averages or filters, for each symbol sample, the plurality of noise samples, to generate a noise estimate.

The erasure detector 45, for each symbol sample, uses a noise estimate to generate an erasure signal. The erasure signal is fed to the erasure input of the FEC decoder 28.

The relative-signal-level detector decodes the plurality of symbol samples, to generate a relative-signal-level sample. The n-bit relative-signal-level sample, or magnitude of the relative-signal-level sample, is fed to the data input of the FEC decoder 28. If the erasure signal were present to erase the symbol sample, then the symbol sample is erased at the FEC decoder 28 input.

The invention includes a method for improving a spread-spectrum receiver in a DS-CDMA system having a plurality of spread-spectrum signals arriving at a base station from a plurality of remote stations. Each spread-spectrum signal in the plurality of spread-spectrum signals has relative-signal-level encoded-symbol samples and a chip-sequence signal lasting a symbol time. The chip-sequence signal is different from other chip-sequence signals in the plurality of chip signals used by other spread-spectrum signals in the plurality of spread-spectrum signals. The spread-spectrum receiver has a matched filter with an impulse response matched to a desired chip-sequence signal in the plurality of chip-sequence signals. The matched filter detects a desired spread-spectrum signal in the plurality of spread-spectrum signals arriving at the spread-spectrum receiver.

The method comprises the steps of sampling at a plurality of symbol times $nT_S$, a plurality of symbol samples; relative-signal-level decoding the plurality of symbol samples, thereby generating a plurality of decoded-symbol samples; sampling, for each symbol sample, at a plurality of chip times $kT_C$, but not at the plurality of symbol times $nT_S$, a plurality of noise samples; averaging the plurality of noise samples; detecting from the symbol sample and from the plurality of noise samples, an erasure condition, and thereby generating an erasure signal; and erasure decoding the plurality of decoded-symbol samples using the erasure signals. Erasure decoding is well known to those versed in the art.

It will be apparent to those skilled in the art that various modifications can be made to relative-signal-level data detection from a spread-spectrum signal using matched-filter obtained side information of the instant invention without departing from the scope or spirit of the invention, and it is intended that the present invention cover modifications and variations of relative-signal-level data detection from a spread-spectrum signal using matched-filter obtained side information, provided they come within the scope of the appended claims and their equivalents.

I claim:

1. An improvement to a spread-spectrum receiver at a base station in a direct-sequence code-division-multiple-access (DS-CDMA) system, having a plurality of spread-spectrum signals modulating differentially-encoded symbols, with each spread-spectrum signal in the plurality of spread-spectrum signals having a chip-sequence signal lasting a symbol time $T_S$, and with each chip-sequence signal different from other chip-sequence signals used by other spread-spectrum signals in the plurality of spread-spectrum signals, with the spread-spectrum receiver including a matched filter having an impulse response matched to a desired chip-sequence signal in the plurality of chip-sequence signals, for detecting a desired spread-spectrum signal in the plurality of spread-spectrum signals arriving at the spread-spectrum receiver, the improvement comprising:

a symbol sampler, coupled to said matched filter, for sampling at a plurality of symbol times $nT_S$, where n is an index to each symbol time, a plurality of symbol samples;

a relative-signal-level decoder, coupled to said symbol sampler, for relative-signal-level decoding the plurality of symbol samples, thereby generating a plurality of decoded-symbol samples;

a noise sampler, coupled to said matched filter, for sampling at any of before, after, or a combination of before and after each decoded-symbol sample, a plurality of noise samples;

an estimator, coupled to said noise sampler, for processing the plurality of noise samples to generate a noise estimate;

an erasure detector, coupled to said estimator and to said symbol sampler, for detecting from a particular symbol sample corresponding in time to the particular decoded-symbol sample and the noise estimate, an erasure condition, thereby generating an erasure signal; and an erasure decoder, having an erasure input coupled to said erasure detector and a data input coupled to said relative-signal-level decoder, responsive to the erasure signal, for erasure decoding the data input.

2. An improvement to a spread-spectrum receiver in a direct-sequence code-division-multiple-access (DS-CDMA) system having a plurality of spread-spectrum signals modulating differentially-encoded data, with each spread-spectrum signal in the plurality of spread-spectrum signals having a chip-sequence signal lasting a symbol time $T_S$, and with each chip-sequence signal different from other chip-sequence signals used by other spread-spectrum signals in the plurality of spread-spectrum signals, with the spread-spectrum receiver including despreading means for detecting a desired spread-spectrum signal in the plurality of spread-spectrum signals arriving at the spread-spectrum receiver, the improvement comprising:

sampler means, coupled to said matched filter, for sampling at a plurality of symbol times $nT_S$, a plurality of symbol samples;

relative-signal-level means, coupled to said sampler means, for relative-signal-level decoding the plurality of symbol samples, thereby generating a plurality of decoded-symbol samples;

said sampler means for sampling at any of before, after, or a combination of before and after each symbol sample corresponding to the particular decoded-symbol sample from a plurality of decoded-symbol samples, a plurality of noise samples;

estimate means, coupled to said sampler means, for processing the plurality of noise samples to generate a corresponding noise estimate for each decoded-symbol sample;

erasure-detection means, coupled to said estimate means, for detecting from the corresponding noise estimate and a symbol sample corresponding to each decoded-symbol sample from the plurality of decoded-symbol samples, an erasure condition, thereby generating a corresponding erasure signal; and an erasure decoder, having an erasure input coupled to said erasure-detection means and a data input coupled to said relative-signal-level means, responsive to the erasure signal, for erasure decoding the plurality of decoded-symbol samples.

3. The improvement as set forth in claim 2 with said sampler means including:
- a noise sampler, coupled to said matched filter, for sampling at the plurality of chip times $kT_C$, but not at the plurality of symbol times $nT_C$, the plurality of noise samples; and
- a symbol sampler, coupled to said matched filter, for sampling at the plurality of symbol times $nT_S$, the plurality of symbol sample.

4. The improvement as set forth in claim 2, with said estimate means including:
- a delay device, coupled to said sampler means, for delaying a symbol sample one symbol time $T_S$, thereby generating a delayed-symbol sample;
- a combiner, coupled to said delay device and to said symbol sampler, for subtracting the delayed-symbol sample from the symbol sample, thereby generating a relative-signal-level sample; and
- a comparator, coupled to said combiner and having a threshold input with a threshold, for comparing the relative-signal-level sample to the threshold, thereby generating a decoded-symbol sample of the plurality of decoded-symbol samples.

5. The improvement as set forth in claim 3, with said estimate means including:
- a delay device, coupled to said symbol sampler, for delaying a symbol sample one symbol time $T_S$, thereby generating a delayed-symbol sample;
- a combiner, coupled to said delay device and to said symbol sampler, for subtracting the delayed-symbol sample from the symbol sample, thereby generating a relative-signal-level sample; and
- a comparator, coupled to said combiner and having a threshold input with a threshold, for comparing the relative-signal-level sample to the threshold, thereby generating a decoded-symbol sample of the plurality of decoded-symbol samples.

6. The improvement as set forth in claim 2, 3 or 4, with said estimate means including a register for storing the plurality of noise samples.

7. A method for improving a spread-spectrum receiver in a direct-sequence code-division-multiple-access (DS-CDMA) system having a plurality of spread-spectrum signals modulating differentially-encoded data, with each spread-spectrum signal in the plurality of spread-spectrum signals having relative-signal-level encoded symbol samples and a chip-sequence signal lasting a symbol time $T_S$, and with each chip-sequence signal different from other chip-sequence signals used by other spread-spectrum signals in the plurality of spread-spectrum signals, with the spread-spectrum receiver including despreading means for detecting a desired spread-spectrum signal in the plurality of spread-spectrum signals arriving at the spread-spectrum receiver, the improvement comprising the steps of:
- sampling, at a plurality of symbol times $nT_S$, where n is an index to each symbol time, a plurality of symbol samples;
- relative-signal-level decoding the plurality of symbol samples, thereby generating a plurality of decoded-symbol samples;
- sampling at any of before, after, or a combination of before and after each symbol sample, a plurality of noise samples;
- processing the plurality of noise samples to generate a corresponding noise estimate for each decoded-symbol sample;
- detecting from the corresponding noise estimate and symbol sample corresponding to each decoded-symbol sample from the plurality of decoded-symbol samples, an erasure condition, thereby generating a corresponding erasure signal; and
- erasure decoding, in response to the erasure signals, the input-data symbols.

* * * * *